US012388903B2

United States Patent
Mas Rosique et al.

(10) Patent No.: US 12,388,903 B2
(45) Date of Patent: Aug. 12, 2025

(54) PROVISIONING APPLICATIONS WITH MOBILE NETWORK PROVIDED DNS SETTINGS

(71) Applicant: Telefonaktiebolaget LM Ericsson (publ), Stockholm (SE)

(72) Inventors: Maria Luisa Mas Rosique, Tres Cantos (ES); Magnus Olsson, London (GB); Magnus Hallenstål, Täby (SE); Jan Backman, Kärna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/288,605

(22) PCT Filed: May 2, 2022

(86) PCT No.: PCT/IB2022/054045
§ 371 (c)(1),
(2) Date: Oct. 27, 2023

(87) PCT Pub. No.: WO2022/229938
PCT Pub. Date: Nov. 3, 2022

(65) Prior Publication Data
US 2024/0388638 A1 Nov. 21, 2024

Related U.S. Application Data

(60) Provisional application No. 63/182,692, filed on Apr. 30, 2021.

(51) Int. Cl.
*H04L 67/00* (2022.01)
*H04L 61/4511* (2022.01)
*H04L 67/51* (2022.01)

(52) U.S. Cl.
CPC .......... *H04L 67/34* (2013.01); *H04L 61/4511* (2022.05); *H04L 67/51* (2022.05)

(58) Field of Classification Search
None
See application file for complete search history.

(56) References Cited

U.S. PATENT DOCUMENTS

| | | | |
|---|---|---|---|
| 7,337,910 B2 * | 3/2008 | Cartmell | H04L 61/30 209/245 |
| 8,526,405 B2 * | 9/2013 | Curtis | H04L 67/02 370/339 |

(Continued)

OTHER PUBLICATIONS

Author Unknown, "Package Index," Android API Reference Packages, developer.android.com/reference/packages, last updated May 10, 2023, 28 pages.

(Continued)

*Primary Examiner* — Ranodhi Serrao
(74) *Attorney, Agent, or Firm* — Sonoda & Kobayashi Intellectual Property Law; Sarvajit S. Patil

(57) ABSTRACT

The present disclosure relates to Edge Computing enhancements by provisioning applications with mobile network provided Domain Name System (DNS) settings. In one embodiment, a method performed by a User Equipment (UE), which supports an Edge Application Server (EAS) discovery procedure with an Edge Application Server Discovery Function (EASDF), includes receiving a DNS setting provided by a mobile network, and storing a first copy of the DNS setting provided by the mobile network as a first DNS setting and a second copy of the DNS setting provided by the mobile network. Herein, the stored first DNS setting is not impacted by any changes made to the second copy of the DNS setting provided by the mobile network.

18 Claims, 5 Drawing Sheets

(56) References Cited

U.S. PATENT DOCUMENTS

| | | | |
|---|---|---|---|
| 2001/0005675 A1* | 6/2001 | Aho | H04W 4/12 455/412.2 |
| 2001/0034767 A1* | 10/2001 | Aho | H04W 4/12 709/217 |
| 2002/0116456 A1* | 8/2002 | Morita | H04L 67/56 709/227 |
| 2002/0138649 A1* | 9/2002 | Cartmell | H04L 61/30 709/245 |
| 2004/0004967 A1* | 1/2004 | Nakatsugawa | H04L 61/5084 370/328 |
| 2004/0083306 A1* | 4/2004 | Gloe | H04L 61/5038 707/999.107 |
| 2004/0179539 A1* | 9/2004 | Takeda | H04L 61/5014 455/445 |
| 2004/0215707 A1* | 10/2004 | Fujita | H04L 67/306 709/201 |
| 2009/0024698 A1* | 1/2009 | Ho | G06F 16/9577 709/203 |
| 2009/0067395 A1* | 3/2009 | Curtis | H04L 67/04 370/338 |
| 2009/0082008 A1* | 3/2009 | Thorell | G06F 11/362 455/423 |
| 2010/0095359 A1* | 4/2010 | Gordon | H04W 12/04 726/6 |
| 2011/0187864 A1* | 8/2011 | Snider | H04N 7/185 348/158 |
| 2012/0179801 A1* | 7/2012 | Luna | H04L 61/58 709/223 |
| 2012/0239731 A1* | 9/2012 | Shyamsunder | G06F 16/955 709/203 |
| 2013/0336210 A1* | 12/2013 | Connor | G06Q 30/01 370/328 |
| 2017/0272316 A1* | 9/2017 | Johnson | H04W 12/068 |
| 2017/0272485 A1* | 9/2017 | Gordon | H04L 65/75 |
| 2020/0329008 A1* | 10/2020 | Dao | H04L 61/5007 |
| 2021/0409335 A1* | 12/2021 | Zhu | H04L 47/24 |
| 2022/0263788 A1* | 8/2022 | Lee | H04L 61/4511 |
| 2022/0345442 A1* | 10/2022 | Lee | H04L 67/10 |
| 2024/0154931 A1* | 5/2024 | Tonesi | H04L 61/4511 |
| 2024/0171936 A1* | 5/2024 | Alnås | H04W 4/021 |

OTHER PUBLICATIONS

Author Unknown, "Technical Specification Group Services and System Aspects; Study on 5G Media Streaming Extensions for Edge Processing (Release 17)," Technical Report 26.803, Version 1.2.0, Apr. 2021, 3GPP Organizational Partners, 51 pages.

Author Unknown, "Technical Specification Group Services and System Aspects; System architecture for the 5G System (5GS); Stage 2 (Release 16)," Technical Specification 23.501, Version 16.6.0, Sep. 2020, 3GPP Organizational Partners, 447 pages.

Author Unknown, "Technical Specification Group Services and System Aspects; 5G System Enhancements for Edge Computing; Stage 2 (Release 17)," Technical Specification 23.548, Version 0.1.0, Mar. 2021, 3GPP Organizational Partners, 29 pages.

Ericsson, "S2-2103859: DNS Settings handling by application under SLA," 3GPP TSG-SA WG2 Meeting #145-e, May 17-28, 2021, Electronic Meeting, 11 pages.

Mockapetris, "Domain Names—Concepts and Facilities," Request for Comments 1034, Nov. 1987, 55 pages.

Hoffman, et al., "DNS Queries over HTTPS (DoH)," Request for Comments 8484, Oct. 2018, Internet Engineering Task Force, 21 pages.

Huawei, et al., "S2-2106256: Remove EN on UE using MNO DNS configuration," 3GPP TSG-WG SA2 Meeting #146E, Aug. 16-27, 2021, Electronic Meeting, 7 pages.

Pauly, et al., "Discovery of Designated Receivers: draft-ietd-add-ddr-00," Internet Draft, Feb. 10, 2021, Internet Engineering Task Force, 11 pages.

Qualcomm Incorporated et al., "S2-2102679: Issues with DNS based EAS (re-)discovery: problem statement," 3GPP SA WG2 Meeting #144E, Apr. 12-16, 2021, Electronic Meeting, 3 pages.

International Search Report and Written Opinion for International Patent Application No. PCT/IB2022/054045, mailed Jun. 27, 2022, 17 pages.

International Preliminary Report on Patentability for International Patent Application No. PCT/IB2022/054045, mailed Mar. 10, 2023, 23 pages.

\* cited by examiner

PROVISIONING APPLICATIONS WITH MOBILE NETWORK PROVIDED DNS SETTINGS

RELATED APPLICATIONS

This application is a 35 U.S.C. § 371 national phase filing of International Application No. PCT/IB2022/054045, filed May 2, 2022, which claims the benefit of provisional patent application Ser. No. 63/182,692, filed Apr. 30, 2021, the disclosures of which are hereby incorporated herein by reference in their entireties.

TECHNICAL FIELD

The present disclosure relates to Edge Computing enhancements by provisioning applications with mobile network provided Domain Name System (DNS) settings.

BACKGROUND

The next mobile wireless communication system or New Radio (NR) will support a diverse set of use cases and a diverse set of deployment scenarios. The later includes deployment at both low frequencies (below 6 GHZ) and very high frequencies (up to 10's of GHZ).

5G System Enhancements for Edge Computing

Edge Computing enables operator and 3rd party services to be hosted close to the User Equipment's (UE's) access point (AP) of attachment, so as to achieve an efficient service delivery through the reduced end-to-end latency and load on the transport network.

In Edge Computing deployment, an application service may be served by multiple Edge Application Servers (EASs) typically deployed in different sites. These multiple EASs that host service may use a single IP address (any cast address) or different IP addresses. To start an Edge Application Service, the UE needs to know the IP address(es) of the Application Server(s) serving the Service. The UE may do a discovery to get the IP address(es) of a suitable EAS (e.g., the closest one), so that the traffic can be locally routed to the EAS, and service latency, traffic routing path, and user service experience can be optimized.

This is the purpose of the EAS (re)discovery procedures defined in 3GPP TS 23.548 v0.1.0 March 2021 System architecture for the 5G System (TS 23.548) for different connectivity models. These procedures provide a translation of a fully qualified domain name (FQDN) of an EAS into the IP address of the EAS, which is topologically as close as possible to the UE, using the Domain Name System (DNS).

TS 23.548 enhances the 5G Reference Architecture in 3GPP TS 23.501 v16.6.0 September 2020 System architecture for the 5G System (TS 23.501) to include a new entity named Edge Application Server Discovery Function (EASDF).

The EASDF plays a role in the EAS (re)discovery procedure described in clause 6.2.3.2.2 of TS 23.548, which targets a Session Breakout connectivity model:

This EAS (re)discovery procedure allows that a Protocol Data Unit (PDU) Session is established with a central PDU Session Anchor (C-PSA), and allows that an Uplink Classifier (ULCL)/Branching Point (BP) and local PDU Session Anchor (L-PSA) to breakout part of the traffic (e.g., traffic of edge applications) are inserted when the Edge application FQDN is resolved.

In this EAS (re)discovery procedure, EASDF influences the DNS resolution so that it conveys a user (topological location) that allows DNS to select an EAS for a PDU Session Anchor (PSA) closer to the user than the current PSA, and the PDU Session update is based on other information in the DNS Response.

The procedure requires that the network (more specifically, Session Management Function) selects an EASDF for the PDU Session and provisions it as the DNS resolver for the PDU Session (there are mechanisms already specified to provide the UE with the DNS settings for the PDU Session). The procedure also requires that these provided DNS settings are used for DNS resolution of Edge AS FQDN.

DNS and Mobile Networks

The DNS is a hierarchical and decentralized naming system for computers, services, or other resources connected to the internet or a private network. It associates various information with domain names assigned to each of the participating entities. Most prominently, it translates more readily memorized domain names to the numerical IP addresses needed for locating and identifying computer services and devices with the underlying network protocols.

The DNS is the most commonly used mechanism for Application clients to discover the IP address of Application servers on the internet, and as described above, it is used by 3GPP to (re)discover the EAS. The 5G core (5GC) Session establishment procedures include Information Elements for the mobile network to provide the UE with the DNS settings for the PDU Session, including the DNS Resolver that the UE should use.

The UE operating system (OS) includes a DNS Stub Resolver and application programming interfaces (APIs) for the resolution of the Mobile Applications domain names (the DNS Stub Resolver is a simple DNS protocol implementation on the client side as described in [RFC1034], Section 5.3.1).

The latest DNS trends include opening to users the configuration of the DNS preferences (i.e., facilitating the overwriting of the DNS settings provided by the network at PDU Session Establishment). In addition, Internet Engineering Task Force (IETF) has specified DNS Queries over HTTPS (DoH), and the DNS clients are moved outside the OS (e.g., to the browser).

Mobile Operating Systems and DNS

A mobile OS is an OS built exclusively for a mobile device, such as a smartphone, personal digital assistant (PDA), tablet or other embedded mobile OS. Popular mobile operating systems are Android, Symbian, iOS, BlackBerry OS and Windows Mobile. Android is leading the mobile OS market.

Android is based on a modified version of the Linux kernel and other open-source software, designed primarily for touchscreen mobile devices such as smartphones and tablets. Android is developed by a consortium of developers known as the Open Handset Alliance and commercially sponsored by Google. It was unveiled in November 2007, with the first commercial Android device launched in September 2008. Android has been the best-selling OS worldwide on smartphones since 2011 and on tablets since 2013. The current stable version is Android 11, released on Sep. 8, 2020. The Android APIs area is available in Android API Reference Packages: https://developer.android.com/reference/packages.

SUMMARY

The present disclosure relates to Edge Computing enhancements by provisioning applications with mobile network provided Domain Name System (DNS) settings. In one embodiment, a disclosed method is performed by a User Equipment (UE), which supports an Edge Application Server (EAS) discovery procedure with an Edge Application Server Discovery Function (EASDF). The disclosed method includes, at an operating system (OS) of the UE, receiving a request for a first domain name system (DNS) setting from an application client of an application via an application programming interface (API) of the OS, obtaining the first DNS setting, and sending the first DNS setting to the application client via the API, responsive to the request. Herein, the first DNS setting is a first copy of a DNS setting provided by a mobile network. In addition, the disclosed method also includes, at the application of the UE, sending the request for the first DNS setting from the application client of the application to the OS via the API of the OS, and receiving the first DNS setting from the OS via the API of the OS.

According to one embodiment, the method performed by the UE further includes, at the OS of the UE, storing a second copy of the DNS setting provided by the mobile network.

According to one embodiment, the method performed by the UE further includes, at the OS of the UE, overwriting the second copy of the DNS setting provided by the mobile network with a second DNS setting and storing the second DNS setting. Herein, the second DNS setting is different from the first DNS setting.

According to one embodiment, the method performed by the UE further includes, at the OS of the UE, storing a second DNS setting that is different from the first DNS setting provided by the mobile network.

According to one embodiment, the method performed by the UE further includes, at a DNS client of the OS of the UE, performing DNS resolving using the second DNS setting.

In one embodiment of the method performed by the UE, the first DNS setting, which is the first copy of the DNS setting provided by the mobile network, is not impacted by any changes made to the second DNS setting.

In one embodiment of the method performed by the UE, the first DNS setting, which is the first copy of the DNS setting provided by the mobile network, is not impacted by any changes made to the second copy of the DNS setting provided by the mobile network.

According to one embodiment, the method performed by the UE further includes, at the application DNS client in the application client of the application of the UE, resolving a fully qualified domain name, FQDN, of the application using the first DNS setting.

According to one embodiment, a method is performed by a UE, which supports an EAS discovery procedure with an EASDF, includes receiving a DNS setting provided by a mobile network, and storing a first copy of the DNS setting provided by the mobile network as a first DNS setting and a second copy of the DNS setting provided by the mobile network. Herein, the stored first DNS setting is not impacted by any changes made to the second copy of the DNS setting provided by the mobile network.

According to one embodiment, the method performed by the UE further includes resolving a FQDN of an application of the UE using the first DNS setting.

According to one embodiment, the method performed by the UE further includes overwriting the second copy of the DNS setting provided by the mobile network with a second DNS setting, storing the second DNS setting, and performing DNS resolving using the second DNS setting.

Corresponding embodiments of a UE, which supports an EAS discovery procedure with an EASDF, are also disclosed. The disclosed UE includes one or more transmitters, one or more receivers, and processing circuitry associated with the one or more transmitters and the one or more receivers. Herein, the processing circuitry is configured to cause an application client of an application to send a request for a first DNS setting to an OS via an API, the first DNS setting being a first copy of a DNS setting provided by a mobile network. The processing circuitry is configured to cause the OS to obtain the first DNS setting and configured to cause the OS to send the first DNS setting to the application client via the API, responsive to the request.

In one embodiment of the UE, the processing circuitry is further configured to cause the OS to store a second copy of the DNS setting provided by the mobile network.

In one embodiment of the UE, the processing circuitry is further configured to cause the OS to overwrite the second copy of the DNS setting provided by the mobile network with a second DNS setting and store the second DNS setting. The second DNS setting is different from the first DNS setting.

In one embodiment of the UE, the processing circuitry is further configured to cause the OS to store a second DNS setting that is different from the first DNS setting provided by the mobile network.

In one embodiment of the UE, the OS further includes an OS DNS client. The processing circuitry is further configured to cause the OS DNS client to perform DNS resolving using the second DNS setting.

In one embodiment of the UE, the application client includes an Application DNS client. The processing circuitry is further configured to cause the application DNS client to resolve an FQDN of the application using the first DNS setting.

In one embodiment of the UE, the processing circuitry is further configured to cause a modem for Third Generation Partnership Project (3GPP) to utilize the first DNS setting or the second DNS setting to transmit signals.

Corresponding embodiments of a UE, which supports an EAS discovery procedure with an EASDF, are also disclosed. The disclosed UE includes one or more transmitters, one or more receivers, and processing circuitry associated with the one or more transmitters and the one or more receivers. Herein, the processing circuitry is further configured to cause the UE to receive a DNS setting provided by a mobile network, and configured to store a first copy of the DNS setting as a first DNS setting and a second copy of the DNS setting. The stored first DNS setting is not impacted by any changes made to the second copy of the DNS setting provided by the mobile network.

In one embodiment of the UE, the processing circuitry is further configured to cause the UE to resolve an FQDN of an application of the UE using the first DNS setting.

In one embodiment of the UE, the processing circuitry is further configured to cause the UE to overwrite the second copy of the DNS setting provided by the mobile network with a second DNS setting and store the second DNS setting, and perform DNS resolving using the second DNS setting.

According to one embodiment, the processing circuitry is further configured to cause the UE to utilize the first DNS setting or the second DNS setting to transmit signals.

BRIEF DESCRIPTION OF THE DRAWINGS

The accompanying drawing figures incorporated in and forming a part of this specification illustrate several aspects of the disclosure, and together with the description serve to explain the principles of the disclosure.

Figure 1:
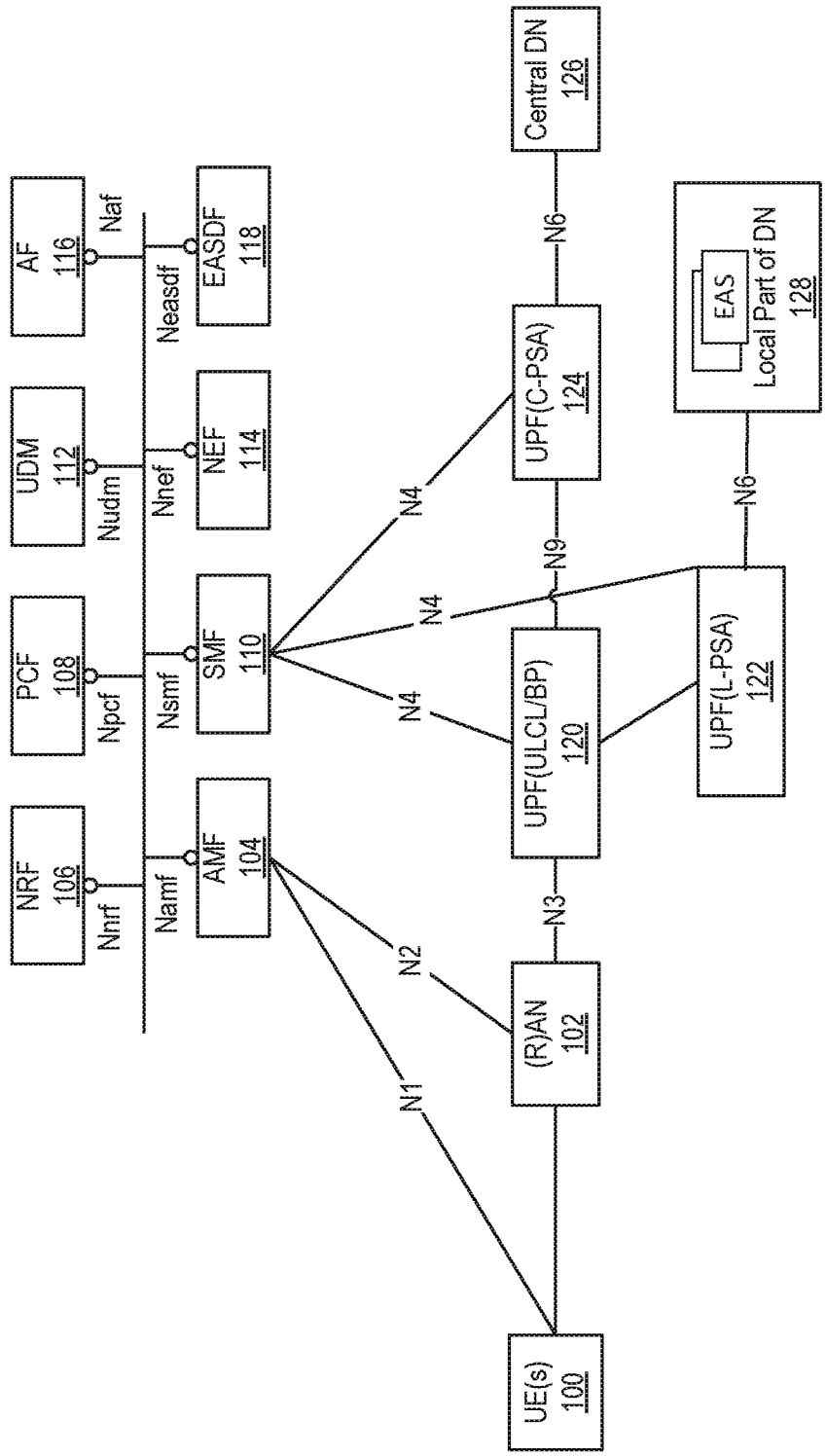
FIG. 1 illustrates a 5G network architecture composed of core network functions including Edge Application Server Discovery Function (EASDF).

It will be understood that for clear illustrations, FIGS. 1-6 may not be drawn to scale.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

In the area of Edge Computing (EC), there currently exist certain challenge(s). With a session breakout connectivity model, the EC application traffic is selectively diverted to the local Protocol Data Unit (PDU) Session Anchor (L-PSA) UPF using Uplink (UL) Classifier or multi-homing Branching Point mechanisms. This differentiated application treatment is based on a service-level agreement (SLA) between the mobile network operators (MNOs) and the Application Provider and requires certain information exchange, (e.g., as a minimum, the IP ranges that identify the traffic to be diverted locally). When a mobile network decides to provide EC connectivity with Session Breakout based on an Edge Application Server (EAS) Discovery Procedure with EASDF, it should be possible that conditions to guarantee the SLA are also agreed. In this case, the Domain Name System (DNS) settings provided for the sessions by the mobile network shall be used for DNS resolution of the application fully qualified domain name(s) (FQDN). However, the latest DNS trends include opening to users the configuration of the DNS preferences (i.e., facilitating the overwriting of the mobile network provided DNS setting). If the application relies on the UE operating system (OS) DNS stub resolver, the application has no way to control that the conditions in the SLA are fulfilled.

Certain aspects of the present disclosure and their embodiments may provide solutions to the aforementioned or other challenges. Device and methods are disclosed herein, in which application clients control that a DNS setting provided by a mobile network can be used in DNS resolution of applications in a UE. In the UE, OS application programming interfaces (APIs) towards the applications are enhanced to make the DNS setting provided by the mobile network available to the applications. In addition, the applications that have SLAs with MNOs can design their application clients to include an application DNS client that resolves its own FQDNs using the DNS setting provided by the mobile network. The present disclosure proposes to enhance the UE so that the DNS settings that nowadays are consumed by an OS DNS Stub resolver are made available to applications.

Certain embodiments may provide one or more of the following technical advantages. The OS and the applications in the UE may utilize different DNS settings for the DNS resolution, so as to achieve a faster, more accurate, and more reliable DNS resolving process.

FIG. 1 illustrates a 5G network architecture composed of core network functions (NFs) using service-based interfaces between the NFs.

Seen from the access side the 5G network architecture shown in FIG. 1 comprises a plurality of UEs 100 connected to either a (R)AN 102 or an Access Network (AN) as well as an AMF 104. Typically, the (R)AN 102 comprises base stations, e.g., such as eNBs or gNBs or similar. Seen from the core network side, the 5GC NFs shown in FIG. 1 include a NRF 106, the AMF 104, a PCF 108, a SMF 110, a UDM 112, a NEF 114, an Application Function (AF) 116, and an EASDF 118.

Reference point representations of the 5G network architecture are used to develop detailed call flows in the normative standardization. The N1 reference point is defined to carry signaling between the UE 100 and the AMF 104. The reference point for connecting between the (R)AN 102 and the AMF 104 is defined as N2. Here are three UPFs: Uplink Classifier (ULCL)/Branching Point (BP) UPF 120, L-PSA UPF 122, and central PDU Session Anchor (C-PSA) UPF 124 in the 5G network architecture. The reference point for connecting between the (R)AN 102 and the ULCL/BP UPF 120 is defined as N3. N4 is used by the SMF 110 and UPFs 120/122/124 so that the UPFs 120/122/124 can be set using the control signal generated by the SMF 110, and the UPFs 120/122/124 can report their states to the SMF 110. N9 is the reference point for the connection between different UPFs 120/122/124.

The 5GC network aims at separating a user plane (UP) and a control plane (CP). The UP carries user traffic while the CP carries signaling in the network. In FIG. 1, the UPFs 120/122/124 are in the UP and all other NFS, i.e., the AMF 104, the NRF 106, the PCF 108, the SMF 110, the UDM 112, the NEF 114, the AF 116, and the EASDF 118 are in the CP. Separating the UP and CP guarantees each plane resource to be scaled independently. It also allows UPFs to be deployed separately from CP functions in a distributed fashion. In this architecture, UPFs may be deployed very close to UEs for example to shorten the Round Trip Time (RTT) between UEs and data network for some applications requiring low latency.

The core 5G network architecture is composed of modularized functions. For example, the AMF 104 and the SMF 110 are independent functions in the CP. Separating the AMF 104 and the SMF 110 allows independent evolution and scaling. Other CP functions like the PCF 108 can be separated as shown in FIG. 1. Modularized function design enables the 5GC network to support various services flexibly.

The service(s) etc. that a NF provides to other authorized NFs can be exposed to the authorized NFs through the service-based interface. Herein, the service-based interfaces are indicated by the letter "N" followed by the name of the NF, e.g., Namf for the service based interface of the AMF 104 and Nsmf for the service based interface of the SMF 110, etc.

Some properties of the NFs shown in FIG. 1 may be described in the following manner. The AMF 104 provides UE-based authentication, authorization, mobility management, etc. One UE 100 even using multiple access technologies is basically connected to a single AMF 104 because the AMF 104 is independent of the access technologies. The SMF 110 is responsible for session management and allocates Internet Protocol (IP) addresses to UEs. It also selects and controls the UPFs 120/122/124 for data transfer. If the UE 100 has multiple sessions, different SMFs 110 may be allocated to each session to manage them individually and possibly provide different functionalities per session. The AF 116 provides information on the packet flow to the PCF 108 responsible for policy control in order to support Quality of Service (QoS). Based on the information, the PCF 108 determines policies about mobility and session management to make the AMF 104 and the SMF 110 operate properly. The UDM 112 stores subscription data of the UE 100. An EASDF 118 handles UE DNS Query from the UE 100. During a PDU Session establishment procedure, the SMF 110 gets the EAS deployment information via the PDU Session related policy information from PCF 108 or the SMF 110 is preconfigured with the EAS deployment information, and the SMF 110 selects an EASDF 118 and provides its address to the UE 100 as the DNS Server to be used for the PDU Session. The UE 100 sends a DNS Query to the EASDF 118. The SMF 110 may configure the EASDF 118 with DNS message handling rules to forward DNS messages of the UE 100 to a relevant DNS server and/or report when detecting DNS messages. The DNS message handling rule includes information used for DNS message detection and associated action(s). The central Data Network (DN) 126 and the local DN 128 (e.g., mobile network), not part of the 5GC network, provide Internet access or operator services and similar. N6 is the reference point for the connection between the UPFs 120/122/124 and the DN 126/128.

An NF may be implemented either as a network element on a dedicated hardware, as a software instance running on a dedicated hardware, or as a virtualized function instantiated on an appropriate platform, e.g., a cloud infrastructure.

Figure 2:
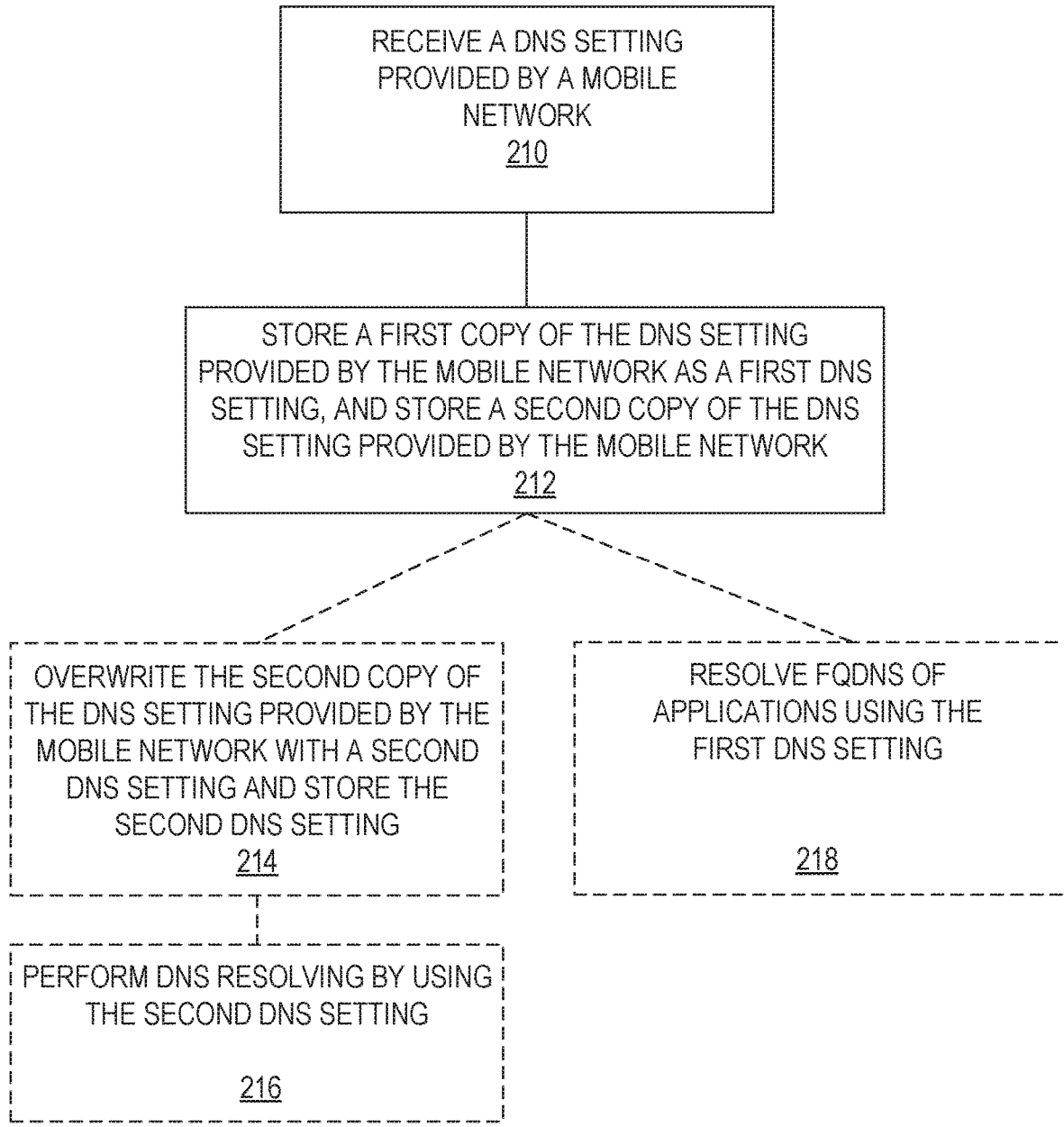
FIG. 2 illustrates an operation flow chart of a User Equipment (UE) in the 5G network architecture illustrated in FIG. 1 according to some embodiments of the present disclosure.

FIG. 2 illustrates an operation flow chart of the UE 100 in the 5G network architecture in accordance with some of the embodiments of the present disclosure. In step 210, the UE 100 is configured to receive a DNS setting provided by a mobile network. The DNS setting provided by the mobile network at least indicates one or more DNS servers for DNS resolution. Then, the UE 100 is configured to store a first copy of the DNS setting provided by the mobile network as a first DNS setting and a second copy of the DNS setting provided by the mobile network in step 212. In one embodiment, the UE 100 may be configured to overwrite the second copy of the DNS setting provided by the mobile network with a second DNS setting and store the second DNS setting, which is to be used by a high-level operating system (HLOS) of the UE 100, in step 214. Also, the UE 100 may be configured to perform DNS resolving by using the second DNS setting in step 216. Herein the second DNS setting may be user DNS preferences for the OS.

In addition, the UE 100 may be configured to resolve FQDNs of applications on the UE 100 by using the first DNS setting (i.e., the DNS setting provided by the mobile network) in step 218. Notice that the first DNS setting is available and unchanged regardless of whether there is a change made to the second copy of the DNS setting provided by the mobile network (i.e., independently on whether the second copy of the DNS setting is overwritten by the second DNS setting). Therefore, the UE 100 may utilize different DNS settings in DNS resolutions.

Figure 3:
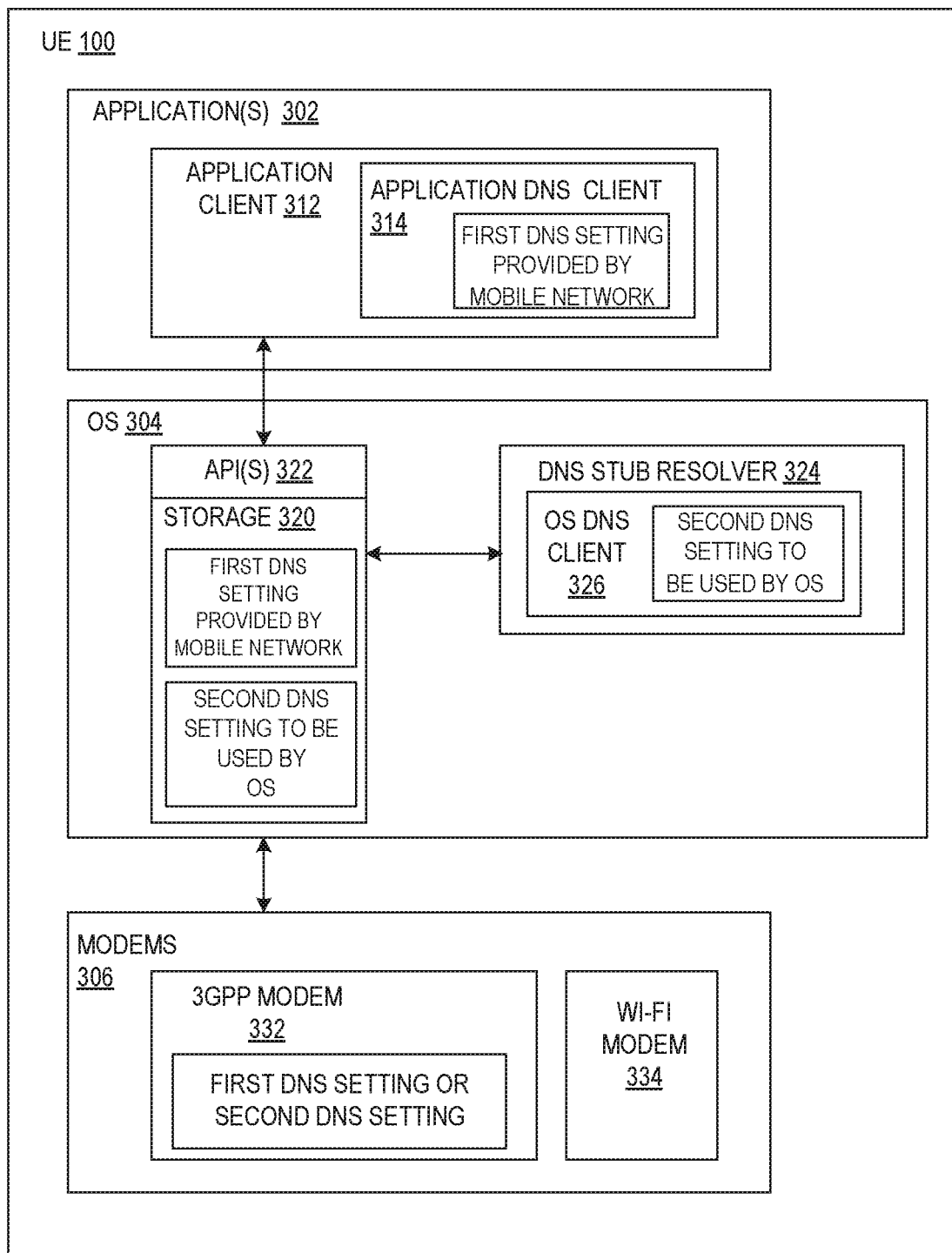
FIG. 3 is a block diagram of the UE according to some embodiments of the present disclosure.

FIG. 3 is an exemplary block diagram of the UE 100 according to some embodiments of the present disclosure. The UE 100 includes one or more applications 302, an OS 304, and modems 306. In detail, at least one application 302 has its own application client 312, which includes an application DNS client 314 to resolve FQDN for the application 302. The OS 304 at least includes a storage 320, one or more APIs 322 corresponding to the one or more applications 302, respectively, and a DNS stub resolver 324 including an OS DNS client 326. In one embodiment, the storage 320 stores the first DNS setting originally provided by the mobile network and also stores the second DNS setting that is a DNS setting to be used by the OS 304 (e.g., a DNS setting to be used by the DNS stub resolver 324/OS DNS client 326 for DNS resolving). The second DNS setting to be used by the OS 304 may be different from the first DNS setting originally provided by the mobile network, and may be a DNS setting that has user DNS preferences for the OS 304.

The API 322 towards the application 302 is enhanced to make the first DNS setting originally provided by the mobile network, which is stored in the storage 320, available to the application client 312 (e.g., available to the application DNS client 314 in the application client 312). As such, the application DNS client 314 can resolve the FQDN for the application 302 using the first DNS setting provided by the mobile network. In one embodiment, the application 302 has SLAs with the MNO, and relies on its own application DNS client 314 to resolve its own FQDN using the first DNS setting provided by the mobile network, but does not rely on the OS DNS client 326 for DNS resolution. Application provider satisfies the MNO conditions in SLAs for best Quality of Experience (QoE).

Notice that the application 302 has its own application DNS client 314 and does not rely on the OS DNS client 326/DNS stub resolver 324 in the OS 304 to resolve the application FQDN. The first DNS setting, which is originally provided by the mobile network and stored in the storage 320, is independent of any changes made to the second DNS setting.

In addition, the modems 306 in the UE 100 are connected to the OS 304 and include a 3GPP modem 332 and a Wi-Fi modem 334. Depending on the DNS resolution for the application 302 or the OS 304, the 3GPP modem 332 utilizes the first DNS setting or the second DNS setting to transmit signals, respectively.

In one embodiment, the implementation of the UE 100, which supports an EAS Discovery procedure with the EASDF 118, guarantees that when networks provision the UE 100 with an EASDF (e.g., the EASDF 118), the application client 312/the application DNS client 314 in the UE 100 can access the first DNS settings provided by the mobile network if the applicant client 312/the application DNS client 314 request so, independently on whether there was any overwriting of the DNS setting to be used by the OS 304.

The application 302 in the UE 100 that is under agreement with a mobile network can guarantee that the EAS Discovery procedures can be followed (and are not affected by user overwriting of the DNS setting used by the OS 304) by implementing its own DNS client 314 and using the original first DNS setting provided by the mobile network to resolve the application FQDNs.

Figure 4:
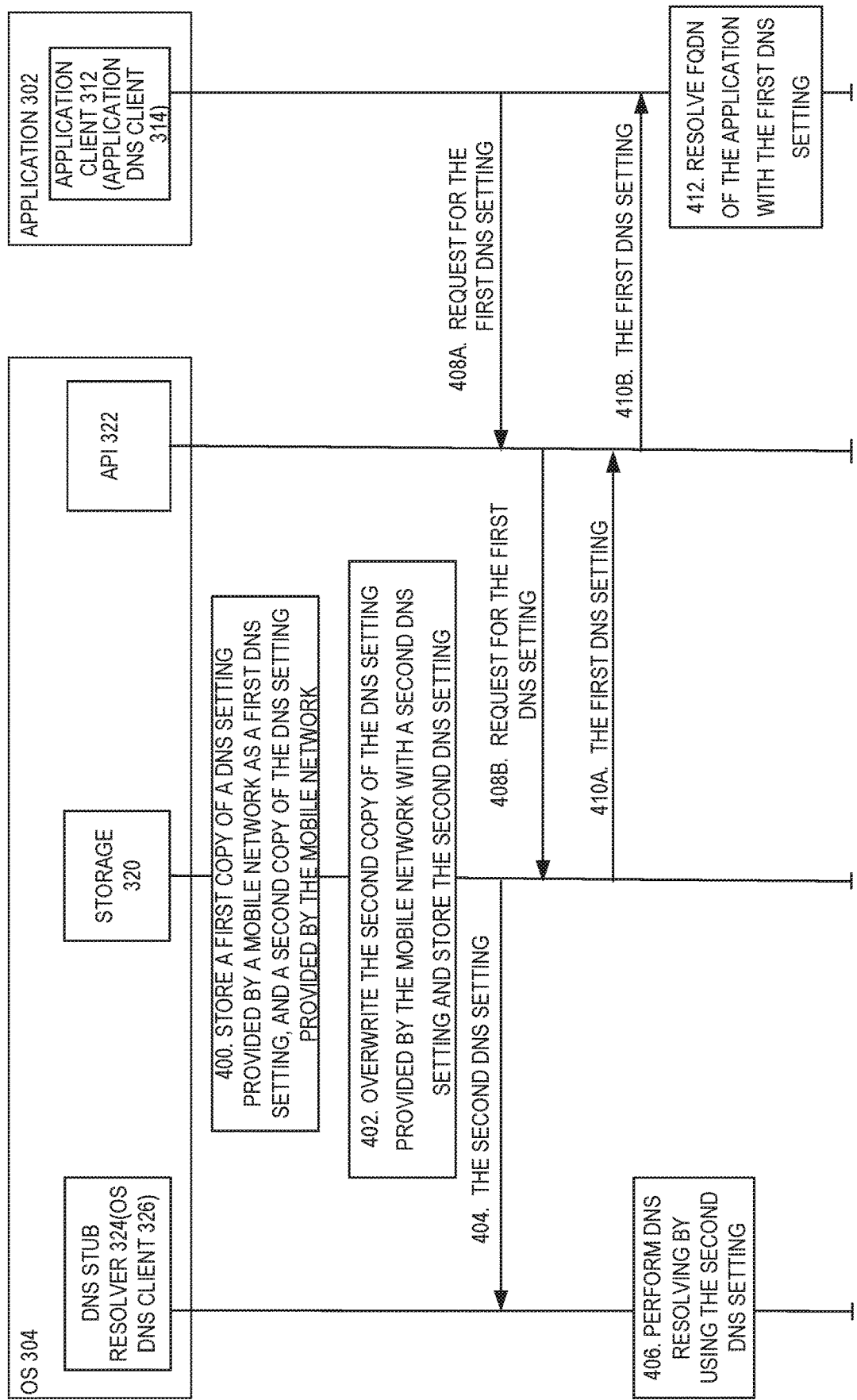
FIG. 4 is a flow diagram that illustrates the operations within the UE illustrated in FIG. 3.

FIG. 4 illustrates a flow diagram that illustrates the operations within the UE 100 in accordance with at least some of the embodiments described above. At the OS 304, the storage 320 is configured to store a first copy of a DNS setting provided by the mobile network as a first DNS setting and also stores a second copy of the DNS setting provided by the mobile network (step 400). In one embodiment, the storage 320 is configured to overwrite the second copy of the DNS setting provided by the mobile network with a second DNS setting and store the second DNS setting (step 402). Herein the second DNS setting is different from the first DNS setting provided by the mobile network and may be user DNS preferences for the OS 304. Once needed, the second DNS setting is read from the storage 320 to the OS DNS client 326/DNS stub resolver 324 (step 404), and the OS DNS client 326/DNS stub resolver 324 perform DNS resolving using the second DNS setting (step 406).

In the application 302, the application client 312/application DNS client 314 may be configured to send a request to the OS 304 for the first DNS setting originally provided by the mobile network. The application client 312/application DNS client 314 sends the request for the first DNS setting to the API 322 of the OS 304 (step 408A). Responsive to the request, the first DNS setting is obtained from the storage 320 to the API 322 (steps 408B and 410A), and then, the API 322 passes the first DNS setting to the application client 312/application DNS client 314 (step 410B). The first DNS setting stored in the storage 320 is independent of any changes made to the second copy of the DNS setting provided by the mobile network and independent of any changes made to the second DNS setting. In step 412, the application DNS client 314/application client 312 is configured to resolve the FQDN of the application 302 with the first DNS setting originally provided by the mobile network.

The above-described mechanism allows the application client 312/application DNS client 314 to use the first DNS setting originally provided by the mobile network in the DNS resolution of the application 302. Herein, the API 322 towards the application 302 is enhanced to make the first DNS settings available to the application client 312. In addition, the application 302, which has the SLAs with the MNO, designs its application client 312 to include one application DNS client 314. Herein, the application DNS client 314 resolves the FQDN of the application 302 using the first DNS setting provided by the mobile network (the FQDN of the application 302 does not rely on the OS DNS client 326/DNS stub resolver 324 anymore).

Figure 5:
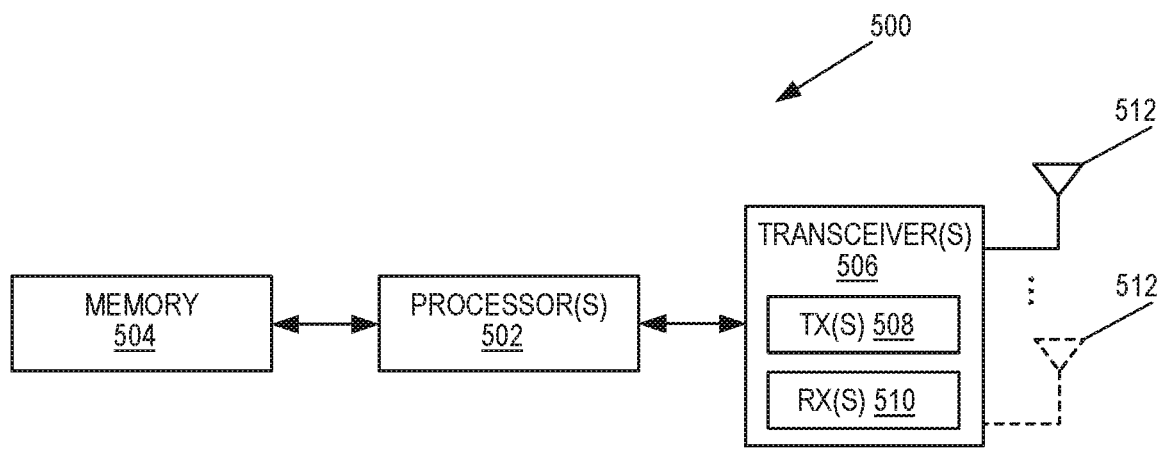
FIGS. 5 and 6 are schematic block diagrams of example embodiments of a wireless communication device (e.g., a UE) in which embodiments of the present disclosure may be implemented.

FIG. 5 is a schematic block diagram of a wireless communication device 500 according to some embodiments of the present disclosure. The wireless communication device 500 may be, for example, the UE 100 as described herein. As illustrated, the wireless communication device 500 includes one or more processors 502 (e.g., CPUs, ASICS, FPGAs, and/or the like), memory 504, and one or more transceivers 506 each including one or more transmitters 508 and one or more receivers 510 coupled to one or more antennas 512. The transceiver(s) 506 includes radio-front end circuitry connected to the antenna(s) 512 that is configured to condition signals communicated between the antenna(s) 512 and the processor(s) 502, as will be appreciated by one of ordinary skill in the art. The processors 502 are also referred to herein as processing circuitry. The transceivers 506 are also referred to herein as radio circuitry. In some embodiments, the functionality of the wireless communication device 500 described above (e.g., one or more functions of the UE 100 described above) may be fully or partially implemented in software (e.g., the OS 304/the application 302) that is, e.g., stored in the memory 504 and executed by the processor(s) 502. Note that the wireless communication device 500 may include additional components not illustrated in FIG. 5 such as, e.g., one or more user interface components (e.g., an input/output interface including a display, buttons, a touch screen, a microphone, a speaker(s), and/or the like and/or any other components for allowing input of information into the wireless communication device 500 and/or allowing output of information from the wireless communication device 500), a power supply (e.g., a battery and associated power circuitry), etc.

In some embodiments, a computer program including instructions which, when executed by at least one processor, causes the at least one processor to carry out the functionality of the wireless communication device 500 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 6:
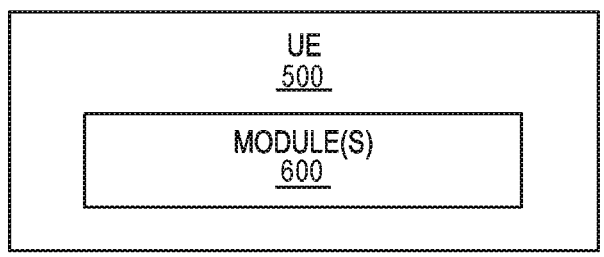

FIG. 6 is a schematic block diagram of the wireless communication device 500 according to some other embodiments of the present disclosure. The wireless communication device 500 includes one or more modules 600, each of which is implemented in software. The module(s) 600 provides the functionality of the wireless communication device 500 described herein (e.g., one or more functions of the UE 100 described above).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according to one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Embodiment 1: A method performed by a user equipment, UE, (100), which supports an Edge Application Server, EAS, discovery procedure with an Edge Application Server Discovery Function, EASDF, (118), the method comprising:
  at an operating system, OS, (304) of the UE (100):
    storing (step 400), by a storage (320), a first copy of a domain name system, DNS, setting provided by a mobile network as a first DNS setting and a second copy of the DNS setting provided by the mobile network;
    receiving (steps 408A and 408B) a request for the first DNS setting from an application client (312) of an application (302) via an application programming interface, API, (322) of the UE (100); and
    sending (steps 410A and 410B) the first DNS setting to the application client (312) via the API (322), responsive to the request; and
  at the application (302):
    sending (step 408A) the request for the first DNS setting from the application client (312) to the OS (304) via the API (322); and
    receiving (step 410B) the first DNS setting from the OS (304) via the API (322).

Embodiment 2: The method of embodiment 1 further comprising, at the storage (320), overwriting (step 402) the second copy of the DNS setting provided by the mobile network with a second DNS setting and storing the second DNS setting.

Embodiment 3: The method of embodiment 2 further comprising, at the OS DNS client (326):
  receiving (step 404) the second DNS setting from the storage (320); and
  performing (step 406) DNS resolving using the second DNS setting.

Embodiment 4: The method of embodiment 2 wherein the first DNS setting, which is originally provided by the mobile network and stored in the storage (320), is independent of any changes made to the second copy of the DNS setting provided by the mobile network.

Embodiment 5: The method of any one of embodiments 2 to 4 wherein the second DNS setting is different from the first DNS setting.

Embodiment 6: The method of any one of embodiments 1 to 5 further comprising resolving (step 412) a fully qualified domain name, FQDN, of the application by an application DNS client (314) in the application client 312 using the first DNS setting.

Embodiment 7: A method performed by a user equipment, UE, (100), which supports an Edge Application Server, EAS, discovery procedure with an Edge Application Server Discovery Function, EASDF, (118), the method comprising:
  receiving (step 210) a domain name system, DNS, setting, provided by a mobile network;
  storing (step 212) a first copy of the DNS setting provided by the mobile network as a first DNS setting and a second copy of the DNS setting provided by the mobile network, wherein the stored first DNS setting is independent of any changes made to the second copy of the DNS setting provided by the mobile network.

Embodiment 8: The method of embodiment 7 further comprising:
  overwriting (step 214) the second copy of the DNS setting provided by the mobile network with a second DNS setting and storing the second DNS setting; and
  performing (step 216) DNS resolving using the second DNS setting.

Embodiment 9: The method of embodiment 7 or 8 further comprising:
  resolving (step 218) a fully qualified domain name, FQDN, of an application of the UE using the first DNS setting.

Embodiment 10: A user equipment, UE, (100), which supports an Edge Application Server, EAS, discovery procedure with an Edge Application Server Discovery Function, EASDF, (118), comprising:
  an application (302) with an application client (312) that includes an application domain name system, DNS, client (314); and
  an operating system, OS, (304) with a storage (320), an application programming interface, API, (322), and an OS domain name system, DNS, client (326), wherein:
    the storage is configured to store a first copy of a domain name system, DNS, setting provided by a mobile network as a first DNS setting and a second copy of the DNS setting provided by the mobile network;
    the application client is configured to send a request for the first DNS setting to the storage via the API; and
    the storage is configured to send the first DNS setting to the application client via the API, responsive to the request.

Embodiment 11: The UE of embodiment 10 wherein the storage (320) is configured to overwrite the second copy of the DNS setting provided by the mobile network with a second DNS setting and store the second DNS setting.

Embodiment 12: The UE of embodiment 11 wherein:
  the storage (320) is configured to send the second DNS setting to the OS DNS client (326); and
  the OS DNS client (326) is configured to perform DNS resolving using the second DNS setting.

Embodiment 13: The UE of embodiment 11 wherein the first DNS setting, which is originally provided by the mobile network and stored in the storage (320), is independent of any changes made to the second copy of the DNS setting provided by the mobile network.

Embodiment 14: The UE of any one of embodiments 11 to 13 wherein the second DNS setting is different from the first DNS setting.

Embodiment 15: The UE of any one of embodiments 10 to 14 wherein the application DNS client 314 is configured to resolve a fully qualified domain name, FQDN, of the application using the first DNS setting.

Embodiment 16: A user equipment, UE, (100), which supports an Edge Application Server, EAS, discovery procedure with an Edge Application Server Discovery Function, EASDF, (118), the UE implemented to:
  receive a domain name system, DNS, setting, provided by a mobile network; and
  store a first copy of the DNS setting provided by the mobile network as a first DNS setting and a second copy of the DNS setting provided by the mobile network, wherein the stored first DNS setting is independent of any changes made to the second copy of the DNS setting provided by the mobile network.

Embodiment 17: The UE of embodiment 16 further implemented to:
  overwrite the second copy of the DNS setting provided by the mobile network with a second DNS setting and store the second DNS setting; and
  perform DNS resolving using the second DNS setting.

Embodiment 18: The UE of embodiment 16 or 17 further implemented to:
  resolve a fully qualified domain name, FQDN, of an application of the UE using the first DNS setting.

Embodiment 19: The UE of any one of embodiments 10 to 18 further comprising a modem for Third Generation Partnership Project, 3GPP, which utilizes the first DNS setting or the second DNS setting.

At least some of the following abbreviations may be used in this disclosure. If there is an inconsistency between abbreviations, preference should be given to how it is used above. If listed multiple times below, the first listing should be preferred over any subsequent listing(s).

| | |
|---|---|
| 3GPP | Third Generation Partnership Project |
| 5G | Fifth Generation |
| 5GC | Fifth Generation Core |
| AF | Application Function |
| AMF | Access and Mobility Function |
| AN | Access Network |
| AP | Access Point |
| API | Application Programming Interfaces |
| AUSF | Authentication Server Function |
| BP | Branching Point |
| CP | Control Plane |
| C-PSA | Central PDU Session Anchor |
| DN | Data Network |
| DNS | Domain Name System |
| DoH | DNS Queries over HTTPS |
| DSP | Digital Signal Processor |
| EAS | Edge Application Server |
| EASDF | Edge Application Server Discovery Function |
| EC | Edge Computing |
| eNB | Enhanced or Evolved Node B |
| FQDN | Fully Qualified Domain Name |
| gNB | New Radio Base Station |
| gNB-DU | New Radio Base Station Distributed Unit |
| HLOS | High Level Operating System |
| HSS | Home Subscriber Server |
| IETF | Internet Engineering Task Force |
| IOT | Internet of Things |
| IP | Internet Protocol |
| L-PSA | Local PDU Session Anchor |
| LTE | Long Term Evolution |
| MME | Mobility Management Entity |
| MNO | Mobile Network Operator |
| MTC | Machine Type Communication |
| NEF | Network Exposure Function |
| NF | Network Function |
| NR | New Radio |
| NRF | Network Function Repository Function |
| NSSF | Network Slice Selection Function |

-continued

| | |
|---|---|
| OS | Operating System |
| PCF | Policy Control Function |
| PDA | Personal Digital Assistant |
| PDU | Protocol Data Unit |
| P-GW | Packet Data Network Gateway |
| PSA | PDU Session Anchor |
| QoE | Quality of Experience |
| QoS | Quality of Service |
| RAM | Random Access Memory |
| RAN | Radio Access Network |
| ROM | Read Only Memory |
| RTT | Round Trip Time |
| SCEF | Service Capability Exposure Function |
| SLA | Service-Level Agreement |
| SMF | Session Management Function |
| UDM | Unified Data Management |
| UE | User Equipment |
| UL | Uplink |
| ULCL | Uplink Classifier |
| UP | User Plane |
| UPF | User Plane Function |

Those skilled in the art will recognize improvements and modifications to the embodiments of the present disclosure. All such improvements and modifications are considered within the scope of the concepts disclosed herein.

The invention claimed is:

1. A method performed by a User Equipment, UE, which supports an Edge Application Server, EAS, discovery procedure, the method comprising:
at an Operating System, OS, of the UE, the OS having a first Domain Name System, DNS, setting provided by a mobile network and a second DNS setting that is a user defined preference for DNS resolution:
receiving a request for the first DNS setting from an application client of an application via an Application Programming Interface, API, of the OS;
obtaining the first DNS setting; and
sending the first DNS setting to the application client via the API, responsive to the request; and
at the application of the UE, for EAS discovery:
sending the request for the first DNS setting from the application client of the application to the OS via the API of the OS; and
receiving the first DNS setting from the OS via the API of the OS; and
resolving a Fully Qualified Domain Name, FQDN, of the application using the first DNS setting.

2. The method of claim 1, further comprising storing the first DNS setting provided by the mobile network and a second copy of the first DNS setting provided by the mobile network.

3. The method of claim 2, further comprising overwriting the second copy of the first DNS setting provided by the mobile network with the second DNS setting and storing the second DNS setting.

4. The method of claim 2, wherein the first DNS setting provided by the mobile network is not impacted by any changes made to the second copy of the first DNS setting provided by the mobile network.

5. The method of claim 1, wherein the second DNS setting is different from the first DNS setting.

6. The method of claim 1, further comprising, at an OS DNS client of the OS, performing DNS resolving using the second DNS setting.

7. The method of claim 1, wherein the first DNS setting provided by the mobile network is not impacted by any changes made to the second DNS setting.

8. A method performed by an application of a User Equipment, UE, the UE supporting an Edge Application Server, EAS, discovery procedure, the method comprising:
sending a request for a first Domain Name System, DNS, setting from an application client of the application to an Operating System, OS, via an Application Programming Interface, API, of the OS, wherein the first DNS setting is provided by a mobile network and is different than a second DNS setting stored by the OS that is a user defined preference for DNS resolution;
receiving the first DNS setting from the OS via the API of the OS, responsive to the request; and
resolving a Fully Qualified Domain Name, FQDN, of the application using the first DNS setting for EAS discovery.

9. The method of claim 8, wherein the FQDN of the application is resolved by an application DNS client in the application client using the first DNS setting.

10. A User Equipment, UE, which supports an Edge Application Server, EAS, discovery procedure, comprising:
one or more transmitters;
one or more receivers; and
processing circuitry associated with the one or more transmitters and the one or more receivers, wherein:
the processing circuitry is configured to cause an application client of an application to send a request for a first Domain Name System, DNS, setting to an Operating System, OS, via an Application Programming Interface, API, to resolve a Fully Qualified Domain Name, FQDN, of the application for EAS discovery, wherein the OS has the first DNS setting is a first copy of a DNS setting provided by a mobile network and a second DNS setting that is a user defined preference for DNS resolution;
the processing circuitry is configured to cause the OS to obtain the first DNS setting; and
the processing circuitry is configured to cause the OS to send the first DNS setting to the application client via the API, responsive to the request.

11. The UE of claim 10, wherein the processing circuitry is further configured to cause the OS to store the first DNS setting provided by the mobile network and a second copy of the first DNS setting provided by the mobile network.

12. The UE of claim 11, wherein the processing circuitry is further configured to cause the OS to overwrite the second copy of the first DNS setting provided by the mobile network with the second DNS setting and store the second DNS setting.

13. The UE of claim 11, wherein the first DNS setting, which is provided by the mobile network and stored by the OS, is not impacted by any changes made to the second copy of the first DNS setting provided by the mobile network.

14. The UE of claim 10, wherein the second DNS setting is different from the first DNS setting.

15. The UE of claim 10, wherein:
the OS further includes an OS Domain Name System, DNS, client; and
the processing circuitry is further configured to cause the OS DNS client to perform DNS resolving using the second DNS setting.

16. The UE of claim 10, wherein the first DNS setting, which is provided by the mobile network and stored by the OS, is not impacted by any changes made to the second DNS setting.

17. The UE of claim 10, wherein:
the application client includes an Application Domain Name System, DNS, client; and the processing circuitry is further configured to cause the application DNS client to resolve the FQDN of the application using the first DNS setting.

18. The UE of claim 10, wherein the processing circuitry is further configured to cause a modem for Third Generation Partnership Project, 3GPP, to utilize the first DNS setting or the second DNS setting to transmit signals.

* * * * *